Oct. 22, 1940.   W. H. GERBER   2,218,789
ROTAMETER
Filed March 18, 1940

WITNESS:
Rob R Mitchel

INVENTOR
Walter H. Gerber
BY
Augustus B. Stoughton
ATTORNEYS.

Patented Oct. 22, 1940

2,218,789

UNITED STATES PATENT OFFICE 2,218,789

ROTAMETER

Walter H. Gerber, Philadelphia, Pa., assignor to Schutte & Koerting Company, Philadelphia, Pa., a corporation of Pennsylvania Application March 18, 1940, Serial No. 324,554

3 Claims. (Cl. 73—209)

One object of the present invention is to fit a rotameter for measuring opaque liquids and fluids.

Another object of the invention is to illuminate the measuring instrument or gauge in such a way that it can be readily read even though the liquid or fluid being measured is sufficiently opaque to obscure the float.

Other objects of the invention will appear from the following description at the end of which the invention will be claimed.

Generally stated, the invention comprises, transparent material exposed at the rim of the float or rotor and edge-lighted from a pole rod on which the rotor is movable.

The invention also comprises the improvements to be presently described and finally claimed.

Figure 1:
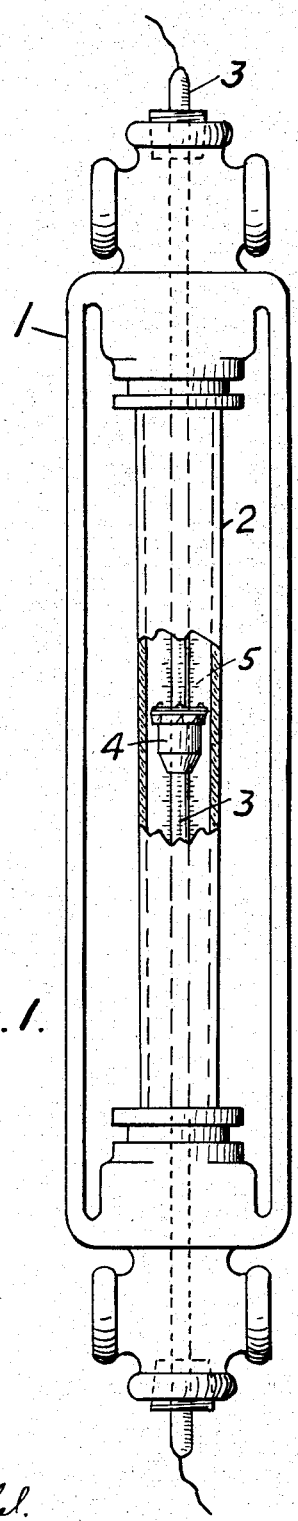
Figure 2:
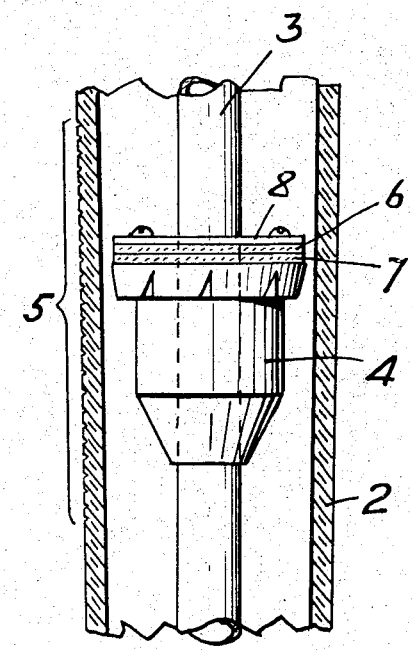

In the following description, reference will be made to the accompanying drawing forming part hereof and in which:

Figure 1 is a side view with parts broken away of a rotameter embodying features of the invention, and Fig. 2 is an enlarged sectional view of parts of the same.

Referring to the drawing, 1 indicates a rotameter in general of usual construction and including a metering tube 2. Through the metering tube 2 is arranged a luminescent tube 3. On this luminescent tube 3 the float or rotor 4 is movable. The metering tube 2 is provided with a scale marking 5. On the float 4 are mounted 2 washer-like rings 6 and 7 of transparent material as "Lucite" or glass adapted for edge-lighting. The ring 8 serves to keep the rings 6 and 7 in place on the float or rotor.

The mode of operation may be described as follows: Assuming that the liquid being measured and flowing through the tube 2 is so opaque that the float or rotor 4 is not visible, the float is made visible by the edge-lighting of the rings or disks 6 and 7 which are edge-lighted from the luminescent tube 3. The rims of these disks or rings are quite close to the inner wall of the tube and, when viewed, they present between them a black line and this dark or black line is used as an index in respect to the scale on the metering tube 2.

It will be obvious to those skilled in the art to which the invention relates that modifications may be made in details of construction and arrangement and in matters of mere form without departing from the spirit of the invention which is not limited in respect to such matters.

I claim:

1. Means for fitting a rotameter having a transparent graduated metering tube and a float or rotor for use in measuring opaque liquids which comprise, a luminescent tube arranged in the measuring tube as a pole rod, and rings of transparent material surrounding the rod and carried by the rotor or float and edge-lighted from the luminescent tube in order to show light near the inner surface of the metering tube in respect to the graduations.

2. Apparatus substantially as described in claim 1 and in which the rings are arranged in pairs and show a black or dark line between them when edge-lighted from the luminescent tube.

3. Means for fitting a rotameter having a graduated metering tube and a float or rotor for use in measuring opaque liquid which comprise, a luminescent tube arranged in the metering tube as a pole rod, and a body of transparent material extending radially of and carried by the float or rotor and edge-lighted from the luminescent tube.

WALTER H. GERBER.